US006652336B1

(12) United States Patent
Chambers

(10) Patent No.: US 6,652,336 B1
(45) Date of Patent: Nov. 25, 2003

(54) POWER TRANSMISSION DEVICE FOR A WATERCRAFT

(76) Inventor: Gary Chambers, 4252 State Rt. 79, Burdett, NY (US) 14818

( * ) Notice: Subject to any disclaimer, the term of this patent is extended or adjusted under 35 U.S.C. 154(b) by 0 days.

(21) Appl. No.: 10/039,323

(22) Filed: Dec. 31, 2001

Related U.S. Application Data

(63) Continuation-in-part of application No. 09/504,612, filed on Feb. 15, 2000, now abandoned.

(51) Int. Cl.[7] .............................................. B63H 20/14
(52) U.S. Cl. ......................... 440/75; 474/113; 474/135
(58) Field of Search ....................... 440/75, 1; 474/113, 474/135, 117; 172/10

(56) References Cited

U.S. PATENT DOCUMENTS

| | | | | |
|---|---|---|---|---|
| 2,010,056 A | * | 8/1935 | Brush | 474/137 |
| 2,371,013 A | | 3/1945 | Wosenitz | 115/37 |
| 3,289,628 A | | 12/1966 | Sable | 115/37 |
| 3,475,982 A | * | 11/1969 | Frank | 474/113 |
| 3,603,296 A | | 9/1971 | Mitchell | 123/41.46 |
| 3,639,077 A | | 2/1972 | Slates | 416/111 |
| 3,922,997 A | | 12/1975 | Jameson | 115/37 |
| 4,166,442 A | * | 9/1979 | Henderson et al. | 123/198 D |
| 4,173,259 A | * | 11/1979 | Heckenkamp | 172/10 |
| 4,428,734 A | | 1/1984 | Ludlow | 440/75 |
| 5,152,721 A | * | 10/1992 | Sajczvk et al. | 474/135 |
| 5,167,546 A | * | 12/1992 | Whipple | 440/1 |
| 5,443,424 A | * | 8/1995 | Henderson | 474/135 |
| 5,520,558 A | | 5/1996 | Kobayashi | 440/38 |
| 5,649,844 A | | 7/1997 | Caricof | 440/75 |
| 5,993,340 A | * | 11/1999 | Rocca et al. | 474/113 |
| 6,312,352 B1 | * | 11/2001 | Holland et al. | 474/113 |

* cited by examiner

*Primary Examiner*—S. Joseph Morano
*Assistant Examiner*—Lars A. Olson

(57) ABSTRACT

The current manufacturing practice in the recreational boating industry is to align and couple a singular inboard engine to a singular impeller drive. The disclosed invention is a power transmission device that allows for coupling of a singular engine to one or more impeller drives. The invention can provide a single engine watercraft with the advantages of a twin-engine watercraft, but at half the complexity and half the weight of a twin-engine installation. The present invention can also be employed for the installation of a larger high performance engine while powering standard low cost impeller drives, and without fear of loss in reliability, or even in a multiple fashion, within a multi-engine watercraft, allowing for various options such as closer placement of the impeller drives without the staggering of engines.

15 Claims, 12 Drawing Sheets

POWER TRANSMISSION DEVICE FOR A WATERCRAFT

This application is a continuation-in-part, in reference to previous application Ser. No. 09/504,612 filed Feb. 15, 2000, now abandoned. This application includes the following specification, with claims 1–15, and abstract, plus enclosed new drawings (12 sheets).

FIELD OF INVENTION

This invention generally relates to marine recreational watercraft propulsion, and more particularly, to a power transmission device that transfers power from a single inboard engine, to multiple spaced apart impellers.

BACKGROUND OF THE INVENTION

It is well known throughout the boating industry that the propelling of a watercraft with at least two spaced apart impellers offers significant advantages over the propelling of a craft with only one impeller. The use of multiple spaced apart impellers, with independent forward and reverse thrust control, can vastly improve low speed docking maneuverability. The use of multiple impellers can improve speeds and the handling of watercraft as well. There are many more advantages of using multiple spaced apart impellers. More will become evident throughout this disclosure.

The long time, and still current practice within the boating industry, is to align and couple a singular inboard engine to a singular impeller drive. Therefore to achieve the benefits of multiple impellers, one must also install multiple engines. This unfortunately is not practical, or even possible in smaller and less expensive watercraft.

To try and remedy this situation, several devices were invented. These inventions provide means for the connection of a single inboard engine to two or more independent impeller drives. This concept potentially provides for the advantages of larger multi-engine crafts within the smaller single engine crafts. Despite many attempts however, none have ever been deployed in common use throughout the recreational boating industry. This includes inventions by Wosenitz (U.S. Pat. No. 2,371,013) filed in March of 1943, to the more recent invention by Caricof, et al. (U.S. Pat. No. 5,649,8440) issued on Jul. 22, 1997. The prior arts have all failed in this regard due to some known design shortcomings, which the present invention overcomes.

DISCUSSION OF PRIOR ART

In the field of this invention, as best as currently known, the only power transmission device that provides a stand-alone modular type of arrangement is the invention by Caricof et al. For the purpose of this disclosure, a stand-alone type of arrangement is one where the components of the power transfer system are basically assembled into a modular form, or device. The stand-alone arrangement is needed to allow universal application in various manufacturers' watercrafts, with various types of engines and impeller drives. To be successful however, this arrangement must also be designed to allow use of the most current installation practices. Inventions such as the one by Wosenitz, and one by Sable, (U.S. Pat. No. 3,289,628) do not use a stand-alone arrangement, which prevents widespread acceptance of these inventions for use throughout the industry, especially within the recreational boating industry.

The invention by Caricof, et al., entitled DUAL DRIVE FOR POWER BOATS comes closest to providing an acceptable device, but falls short due to a few, but critical design shortcomings. The invention comprises a housing, supporting three main shafts, which are one input shaft and two output shafts. The shafts are connected for rotation by chains. Engine power enters through the input shaft, then exits out the two output shafts, for driving of two impellers. The shortcomings are explained below.

The first shortcoming of this prior art is the use of chains and sprockets. Chains by definition are a series of metal links connected to one another, used for transmission of mechanical power. The use of chains, for the purpose of powering a marine watercraft, requires continuous lubrication. This in turn requires the use of an oil filled and tightly sealed enclosure, or housing, as the inventors illustrate. This presents issues and concerns to the industry, which include concerns of leaks, ingress of moisture, corrosion, and oil contamination, which all lead to reliability problems. Furthermore, it provides difficulties in servicing and maintaining the device, especially within the very limited confines of a marine engine compartment.

A second shortcoming is the use of three shafts. With chains, this requires use of two separate chains with two sets of sprockets, adding additional and unwanted, weight, size, and cost to the device. This is unacceptable when considering use in small, and low cost watercrafts.

Thirdly, the inventors also teach to mount the two output shafts utilizing non-concentric adjustable bearing housings, allowing for varying of the axes of rotation. Adjustment is required with the use of chains, for the periodic take-up of chain slack. Removal of slack is accomplished through the varying and increasing of the spacing, or center distance, between the shafts. The adjustable bearing housings are the inventors' means to remove slack after assembly, then to periodically adjust for the wear and stretch of the chains throughout the life of the device. In a device such as this, wear and stretch are accelerated by the high centrifugal forces, caused when moving heavy chains through the speeds observed within this type of transmission device. Periodic adjustments must therefore be made to minimize backlash, and to prevent disengagement of the chains from their sprockets. The need for this adjustment is one of the greatest shortcomings of this particular prior art. This is also true for any other prior art utilizing chains, or using this type of adjustment. The reasons are explained below.

Adjusting of shaft center distance within a marine engine compartment would be very difficult, but even more important is that the adjustment eliminates the ability to employ this device in practice with today's direct plug-in type of impeller drives. These drives, which are also referred to as plug-in sterndrives, are the ones most demanded by the industry for use within inboard powered recreational watercraft. This type of drive however, requires for precise, and permanent location of the transmission output shafts. This is necessary to maintain concentric alignments between the transmission and the impeller drives which are mounted to the hull of the craft, specifically between the transmission output shafts, and the impeller input shafts, which insert directly into couplings mounted on those output shafts. This plug-in arrangement is demanded because it is the most compact and most cost efficient means of connection to a sterndrive today. This method will be illustrated and discussed in more detail later.

Furthermore, one cannot employ this device with any impeller drive in the smaller recreational watercrafts. This is due to the additional room required for significant lengths of universal drive shafts, needed to transfer power from the device to the impeller drives. Caricof et al. in their FIG. 1, as parts 17 and 19, illustrate these lengthy drive shafts. These long shafts must be used to compensate for misalignments caused by the adjustments in shaft center distance.

Accordingly, when considering use of this prior art, especially within the smaller and less expensive recreational watercrafts, the shortcomings are:

a) the excessive weight, size, and cost associated with the use of multiple sets of heavy steel chains and sprockets;

b) the additional complexity and cost of using a second output shaft, with all its associated parts;

c) the need and concerns of continuous lubrication;

d) the requirement for a tightly sealed and oil filled enclosure;

e) the need for periodic and difficult maintenance;

f) and, this unacceptable adjustment in shaft center distance.

Improvements and Advantages of the Present Invention

A collection of several features was assembled to overcome the shortcomings of the above prior art, as well as other prior arts. In addition, further improvements have been developed to help promote the use of the present invention throughout the boating industry. These will be discussed below and throughout the remaining sections.

The first feature for improvement is a synchronous belt. In contrast to a series of metal links, a belt by definition is a continuous band of tough flexible material. This allows assembly of a corrosion free, oil free, and maintenance free belt drive system. Use of any belt to transfer power instead of chains or gears, eliminates the need for continuous lubrication, seals, gaskets, and a leak proof enclosure. Through use of a synchronous type bed it further eliminates concern for slip, wear, backlash, and any need for future adjustments. Discussion of a third improvement below will explain how a synchronous belt can be utilized successfully in a high power transmission device such as this. But, before that discussion, additional reasons, and advantages encouraging use of this belt are as follows.

The synchronous belt, with its gear shaped teeth for positive engagement into matching type pulleys, was selected over all other type of belts. These included v-belts, multi-ribbed belts, flat belts, and the others. The synchronous belt was selected because it can eliminate all concern for slip. Slip reduces driveline efficiency and induces heat build-up. That leads to reliability and fire safety concerns, not acceptable for consideration in any watercraft. Gears could have been selected to prevent the slip, but a belt must be used to allow the flexibility needed to space the impeller drives at various distances, without concern for gear size, weight, changes in ratio, and again, a need for continuous lubrication.

The synchronous belt is also preferred because it operates at higher efficiencies than gears, or chains, or the other belts. It also operates at a lower noise level. This is a benefit to the industry to help maximize fuel efficiency, and in meeting the tighter noise limit regulations.

The light weight characteristic of the synchronous belt allows for reductions in the physical size, strength, and cost of components compared to using chains and gears. An example would be the preferred use of aluminum pulleys verses the heavy steel sprockets of the prior art. The lighter weight belt also reduces the centrifugal forces generated from the motion of itself, allowing use of long belts and higher rotational speeds than heavy chains allow. This allows the possible use of the present invention with some of today's highest performing engines.

By allowing use of long belts, it also provides for an all-new capability and product line opportunity within the recreational boating industry. The lightweight synchronous belt allows use of the present invention in multi-hulled tunnel crafts known as catamarans. Catamarans utilize two spaced apart sections of hulls. They are typically manufactured with an engine and impeller drive mounted at each hull. This then provides for an unobstructed tunnel area between the hulls. In high performance catamarans, the tunnel is used to produce aerodynamic lift, lifting the craft partially out of the water. This effect significantly reduces the wetted surface area, and in turn the frictional drag on the hulls. That in turn, allows for greater speeds than can ever be achieved by conventional hulled watercrafts. Because of this superior performance benefit, consumers have demanded that the industry build a lower priced, single engine catamaran. However, to meet the overall performance requirements, they have had to add a third and centrally located section of hull, called a center pod, located down the bottom center of the boat. This third hull is used to support the conventional single engine, single impeller drive arrangement, in a low mounted position that provides for best overall performance. The two major shortcomings of this type of design are that the center pod reduces the available unobstructed tunnel area for providing aerodynamic lift, plus, because it also rides in the water, adds additional drag and power loss to the craft. This has been the accepted norm, even with a significant compromise in performance, until now.

Through use of a synchronous belt to transfer power over greater distances, two impeller drives can now be installed on the spaced apart hulls. At the same time, the economical single engine package can be installed to power the two impellers. The present invention can now provide for the manufacturing of a true, single engine catamaran type of watercraft. This watercraft can now have the same superior performance benefit, the unobstructed tunnel, that the higher priced multi-engine catamarans have had a monopoly on for years. In addition, the spaced apart impeller arrangement improves high-speed stability, low speed handling and performance, and docking maneuverability.

A second feature for improvement is a new multi-purpose shaft. This is referred to as a throughput shaft. The throughput shaft is used in place of a dedicated single purpose input shaft as in the prior art. This new shaft may be used in a multitude of ways. The throughput shaft is designed in such a way as to first deliver power into the present invention. The throughput shaft may then be used to either transmit a proportional amount of power directly through itself, to power an impeller drive, or to operate or power an auxiliary device or other piece of equipment, or it may even be used to do no secondary function at all. This option can provide an advantage in a twin-engine watercraft where two engines and a total of two impeller drives are still preferred. The advantage in this case could be to offset each of the impeller drives closer to each other, in a closeness never before achievable without staggering of the engines. This allows for performance improvements never before realized, which will be discussed later in this disclosure. If however the throughput shaft is used to power a second impeller drive, it can eliminate the necessity for a second separate output shaft as in the prior art. This avoids the increased complexity, manufacturing cost, and increased weight of providing a third shaft. Additionally, by elimination of that extra shaft, pulleys, bearings, etc., it allows for a more compact space requirement for application of the present invention in smaller, and lower priced, watercrafts.

A third and key improvement is the permanent fixing of shaft centerline locations. All the power delivery shafts of the present invention can be assembled and permanently located in a final position, for use in those positions throughout the life of the device. No adjustments in center distances will ever be required. This fixing of shaft locations is made possible in part through the use of a synchronous belt, however, to allow successful application of a synchronous belt, especially in a high power transmission such as this, the belt must be employed in combination with a means which applies a predetermined and critical amount of tension preload into that belt. This is key, because it will allow use of those demanded plug-in type of impeller drives. Below is an explanation of why, and how a synchronous belt can successfully be employed.

It is commonly assumed, and in most cases correctly assumed, that a synchronous belt can be used to control position of equipment, maintain synchronous timing of components, or to drive certain power devices while never needing any maintenance or adjustment, and most likely, never needing replacement. In comparison, chains must routinely be maintained, adjusted, and eventually replaced. This is required to rid a system of excess slack and prevent possible disengagement of the chain during its operation. This slack is caused by the wear within the metal links that make up the chain. A belt on the other hand has no metal links. It will not wear in a manner to cause this excess slack. This is made possible by the elastic properties of the materials that make up a belt. These properties also allow a belt to accept a significant amount of tension, without the fear of inducing failure as it does in chains. This leads to one of the most important discussions in this disclosure.

During the propelling of a watercraft, where submerged sections of hull are subjected to continuous drag, the power source and all the power transmission devices connected to that source are subjected to a continuous load condition. This load also increases exponentially with respect to increases in watercraft speed. This type of severe duty is what has made the successful employment of a belt drive transmission system within a marine watercraft so difficult to achieve, which brings up a very important point.

If a synchronous belt can be installed in a device, with a predetermined amount of tension preload placed into that belt, of sufficient magnitude to at least equal the tension that would be generated in that belt during maximum power transfer, plus, an amount equal to the additional tension that would be generated by the centrifugal force of moving that belt about the transmission at maximum operating speed, then that preloaded tension would prevent any further elongation of that belt, throughout the entire operating range of the device.

Prevention of further elongation within a belt will eliminate two effects that can cause failure in a belt drive system of this type. The first effect that can cause failure is cyclic elongation, or the stretching and relaxing of a belt each time it completes its path within the transmission. If not prevented, a failure mode called cyclic fatigue can occur, which is the progressive fatigue failure of the individual reinforcing fibers within the belt. This is similar to the breaking of a paper clip when flexed back and forth repeatedly. The second effect that will cause failure, is belt elongation or stretching on the tight side of the belt drive system whenever the belt is being pulled hard under load, causing the slack side of the belt drive system to go relaxed, as if an apparent excess length of belt was delivered to the slack side. This effect causes looseness of the belt around the drive pulley. This can then lead to the slipping and jumping of the belt teeth over the drive pulley, leading to tearing and wearing of the teeth, leading to eventual failure of the teeth. That is why chains and gears, with their relatively inelastic properties, have typically been the choice for high power, severe duty marine transmission devices. However, through continuous development of new belt materials and reinforcement fibers, higher magnitudes of tension preload are now being able to be applied, and can be taken advantage of by using the method explained below.

By comparison of a belt manufacturers' data, in conjunction with standard centrifugal force and horsepower conversion equations, one can calculate for any given power application, and for any particular synchronous belt, the tension preload that will prevent further elongation of that belt. If the belt manufacturer will state that the belt can be operated continuously at the corresponding levels of stress, then the above described modes of failure can be completely avoided. This can finally allow use of a belt drive power transmission system in a watercraft, to allow the fixing of the shaft centerlines. This in turn allows use of the present invention with those direct plug-in types of impeller drives. The features of the present invention to provide for this tension preload will be discussed in more detail later within this disclosure.

It should also be pointed out that through application of the throughput shaft as described in this invention, to transfer a proportional amount of power directly through itself, say to drive another impeller, the remaining portion of the power is all that must be transferred by a belt. This allows for greater overall power transfer through the present invention than one might initially think based on the limits of a belt.

It must further be noted that the present invention can also be employed with any of the other types of propulsion drives, such as jet drives, surface drives, and others, beyond the plug-in type sterndrives discussed and illustrated in this discosure for the purpose of describing the present invention.

Objects of the Present Invention

Accordingly, to overcome the shortcomings of the prior art, the objects of the present invention are:
a) to reduce the weight, size, and cost of a transmission through use of a synchronous belt, a multi-purpose throughput shaft, and lighter components;
b) to provide a simplified and lower cost transmission by eliminating the need for a second output shaft and all its associated parts;
c) to provide a corrosion free and oil free transmission;
d) to provide a transmission free of gaskets, seals, and the need for a tightly sealed enclosure;
e) to provide for maintenance free operation;
f) to provide fixed placement of transmission shafts, allowing use with direct plug-in sterndrives, plus use in smaller, less expensive, watercrafts.

Additional objects of the present invention are:
g) to provide a transmission which is backlash free;
h) to provide improved operating efficiency and lower noise levels;
i) to provide a bet driven power transfer device, usable in this severe duty marine application;
j) to create entirely new product line opportunities within the boating industry.

Further features and advantages of the present invention will become better understood when considered with the subsequent descriptions and illustrations.

SUMMARY OF THE INVENTION

The present invention is a stand-alone power transmission device, comprising a housing, a throughput shaft, plus at least one output shaft spaced apart from said throughput shaft, a pulley system including at least one synchronous belt rotatively connecting said throughput shaft to said output shaft, means to allow for the transfer of power into or out of each said shaft, and means to preload a predetermined amount of tension into said synchronous belt, whereby said transmission may now allow fixed placement of the transmission shafts, in turn allowing use with plug-in type impeller drives, and in a compact manner sufficient to allow use in smaller recreational watercraft.

BRIEF DESCRIPTION OF THE DRAWINGS

FIG. 3a is a separate cutout view within FIG. 3 for depicting details of an adjustable belt-tensioning device.

DETAILED DESCRIPTION OF THE INVENTION

Construction of the Present Invention

Figure 1:
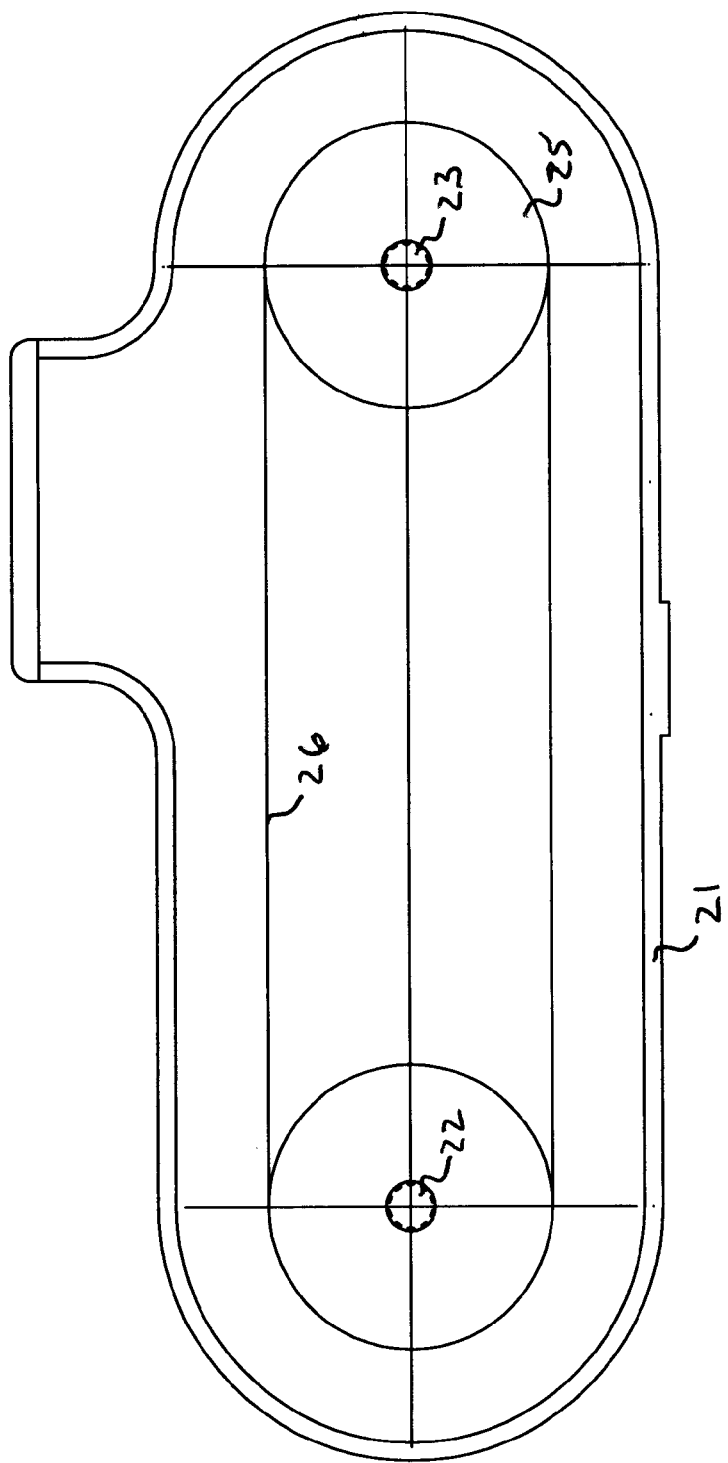
FIG. 1 is a schematic view of the inside of the present invention, as viewed from the front (or engine side).

FIG. 1 is a schematic view of the inside of the present invention, as viewed from the front (or engine side). The view shows the general arrangement comprising compact housing case 21, throughput shaft 22 and spaced apart output shaft 23. Both are mounted for rotation in bearings (not shown). First belt pulley 24 is attached to throughput shaft 22, second belt pulley 25 is attached to output shaft 23, and synchronous belt 26 drivingly coupling said pulleys.

This is the simplest and most cost-effective arrangement, but requires a housing comprising bearing bores that in their final ready state, provide for precisely spaced and fixed shaft centerline positions for use of the device. The bores provide the means to preload tension into the synchronous belt, by supporting the bearings, with their shafts, at the center distance required to preload the synchronous belt with a desired tension.

Through use of a belt manufacturer's data and standard mechanics equations, one can calculate the belt elongation for the desired tension preload, then calculate the shaft center distance corresponding to that elongation. When employing this center distance, the bearings, with respective shafts and pulleys, are located further apart than a relaxed belt will allow. This will require physical spreading of the shafts, with pulleys and belt installed, during the assembly process. Again, this form of the invention provides for the simplest, most compact, and most cost effective transmission. It now allows use of this device in smaller and less expensive watercrafts. It must be emphasized however that impeller spacings are restricted to the calculated preload center distances of each selected belt, for use in a particular application.

Figure 2:
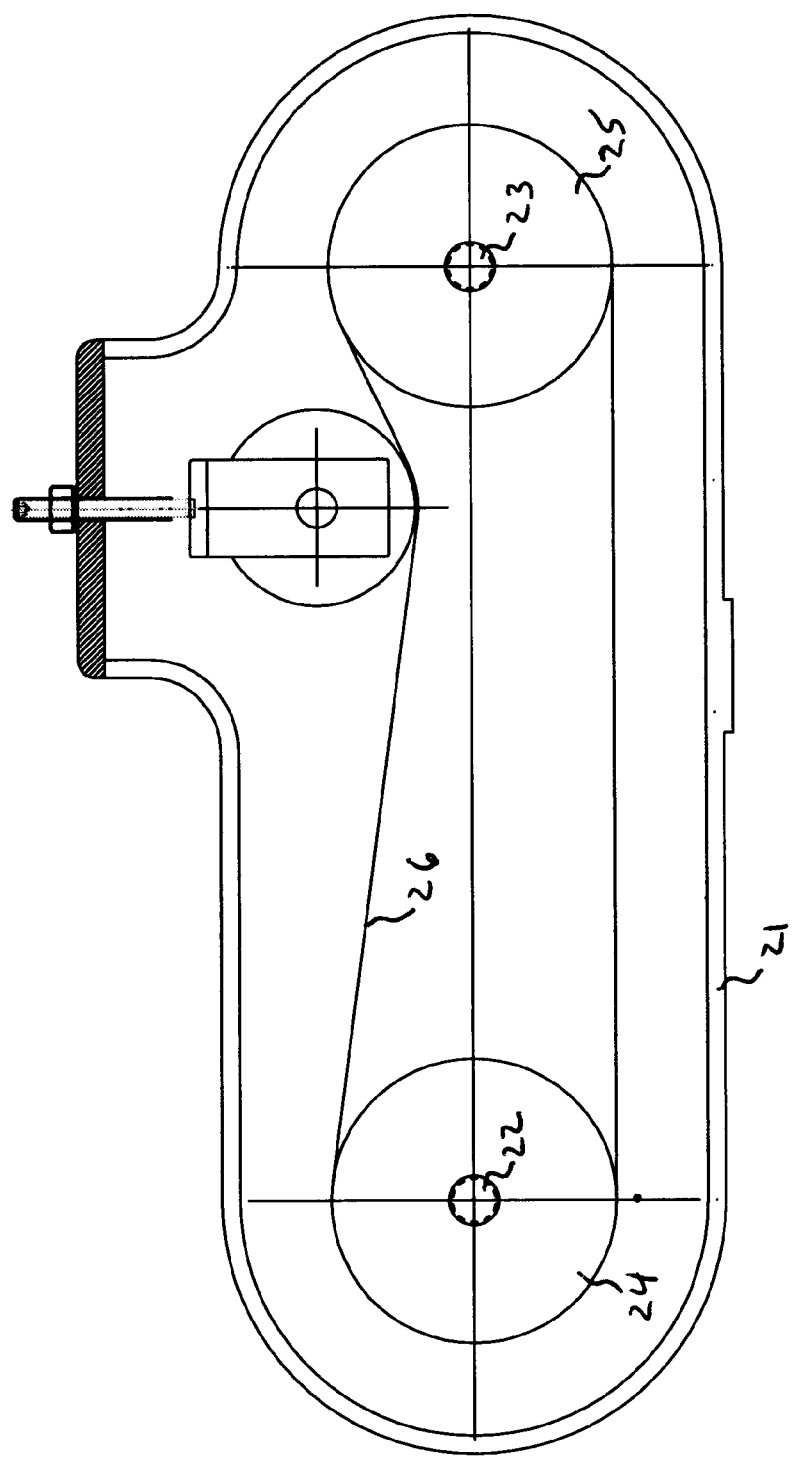
FIG. 2 is a schematic view of the inside of the present invention employing use of an adjustable tensioning device.

FIG. 2 is a schematic view of the present invention, which depicts use of an alternate means for preloading the synchronous belt. This may be accomplished through use of an adjustable tensioning device. The view shows compact housing case 21, throughput shaft 22 and spaced apart output shaft 23. Both shafts are mounted for rotation in bearings (not shown) with first belt pulley 24 attached to throughput shaft 22, and second belt pulley 25 attached to output shaft 23. Synchronous belt 26 drivingly couples said pulleys, with belt tensioning assembly 19 now providing for the tension preload needed in said belt 26.

The use of an adjustable tensioning device eliminates restrictions in impeller spacing. This allows the drives to be placed at a distance that might better meet the needs of a watercraft manufacturer. This improvement allows for the fine-tuning of impeller placements when attempting to achieve maximum performance from a particular hull design.

Prior arts, including those of Kobayashi (U.S. Pat. No. 5,520,558), Slates (U.S. Pat. No. 3,639,077), and Mitchell (U.S. Pat. No. 3,603,296) have disclosed additional pulley means to do what most inventors have commonly referred to as "provide tension on the belt". However, upon closer examination, all are either simply taking up excess slack in the belts, or as Kobayashi states and illustrates, to provide a path that directs the belt around other components, or with Slates, who uses the means to provide adequate tooth engagement for proper operation, or even as Mitchell, who discloses to place a pulley means against the back side of the belt with enough pressure to generate enough friction to drive an auxiliary device connected to that pulley. None however utilize or teach to use a means for calculating and applying a tension preload which is sufficient in magnitude to prevent further elongation of the belt during all phases of operation, and just as importantly, while transferring continuous amounts of large power, and doing so without slip, failure, or any need for future adjustment to the belt or to the shaft centerlines.

Through use of belt manufacturers' data and standard mechanics equations, one can determine the application of force needed through the tensioning device that will adequately preload the belt with sufficient tension. A belt deflection method can then be employed to verify that proper preload has indeed been applied during the final assembly process. Again, use of at least one adjustable tensioning device allows for increased flexibility in impeller spacing.

It must be noted that FIG. 2 depicts only one arrangement, of one design, and the use of only one adjustable tensioning device. One may prefer another arrangement or tensioner design, or even use of multiple tensioners, or even a fixed belt take-up device, in conjunction with appropriately spaced bearings similar to that discussed with FIG. 1. All will provide additional flexibility in impeller drive spacing.

It should further be noted that multiple belts, and pulleys if needed, may be used in a stacked manner overlaying either of these arrangements, along with respectfully longer throughput and output shafts, to further increase power transfer capability of the present invention.

Figure 3:
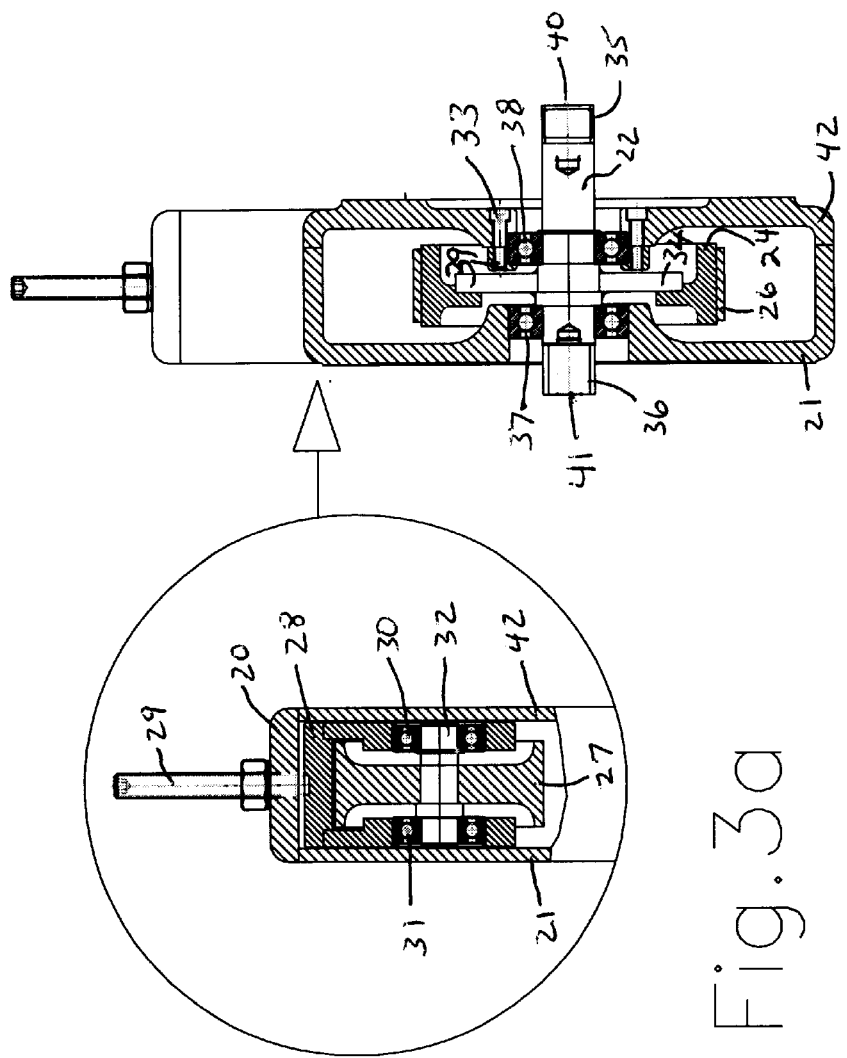
FIG. 3 is an end cut-away view for showing the details of a throughput shaft and components.

FIG. 3 and FIG. 3A show the details of a throughput shaft assembly, and a detailed example of an adjustable tensioning device. The adjustable tensioning device is shown in the circled cutout view FIG. 3A comprising tensioning pulley 27, attached to pulley shaft 32, mounted in bearings 30 and 31, allowing the pulley to spin freely. Said bearings are supported within inverted u-shaped bracket assembly 28, which can be positioned by adjustment screw 29, which is threaded through plate 20. Screw 29 pushes u-shaped bracket 28, with said bracket being slightly wider in size than the nominal distance between assembled case 21 and cover 42, but which nests within two grooves machined into said case and cover, to accept said wider bracket. The grooves can guide the assembly for application of pressure to the backside of the synchronous belt, thereby preloading the synchronous belt with desired tension. Again, it should be noted that this depicts only one design and an arrangement using only one tensioner device. The use of multiple tensioners, take-up pulleys, or other designs and placements, may be more preferred.

FIG. 3 shows a throughput shaft assembly, shown in an end cutaway view of the present invention, comprising throughput shaft 22, with depicted splines 35 and 36, cut to a sufficient diameter and length for the power delivered, with first spline 36 and threaded hole 41 in the end of the shaft, which may be used for attachment of various coupling assemblies to transfer power to various type impeller drives. Second spline 35 and threaded hole 40 may also be used for attachment of various coupling devices, or for direct insertion of spline 35 into an engine drive coupling. Shown are bearings 37 and 38, shown supporting throughput shaft 22 for rotation, with bearings 37 and 38 carried in bores cut into the housing case 21 and housing cover 42 respectively. Bearing cap 39 is clamped tightly over the end of bearing 38, to hold the bearing in the bore and retain the assembly in a fixed axial position relative to housing case 42. A plurality of screws such as screw 33 may be used to retain the bearing cap. Finally, belt pulley 24 may be attached with a plurality of screws (not shown) to a flange 34 on throughput shaft 22, to transfer power through belt 26 to an output shaft (not shown). One may wish to attach the pulley by other means commonly employed for that purpose. It must be noted that it may be preferred to utilize a different mounting technique for the bearings, such as use of bolted assemblies, or use of sleeves within the bores, or use of other methods, and a different configuration for the housing of the invention, such as flat plates, or arched plates with spacer bars, or other supports between, but whatever the method used, the bearings must be fixed in a final location, maintaining final shaft center distances during use of the device.

Figure 4:
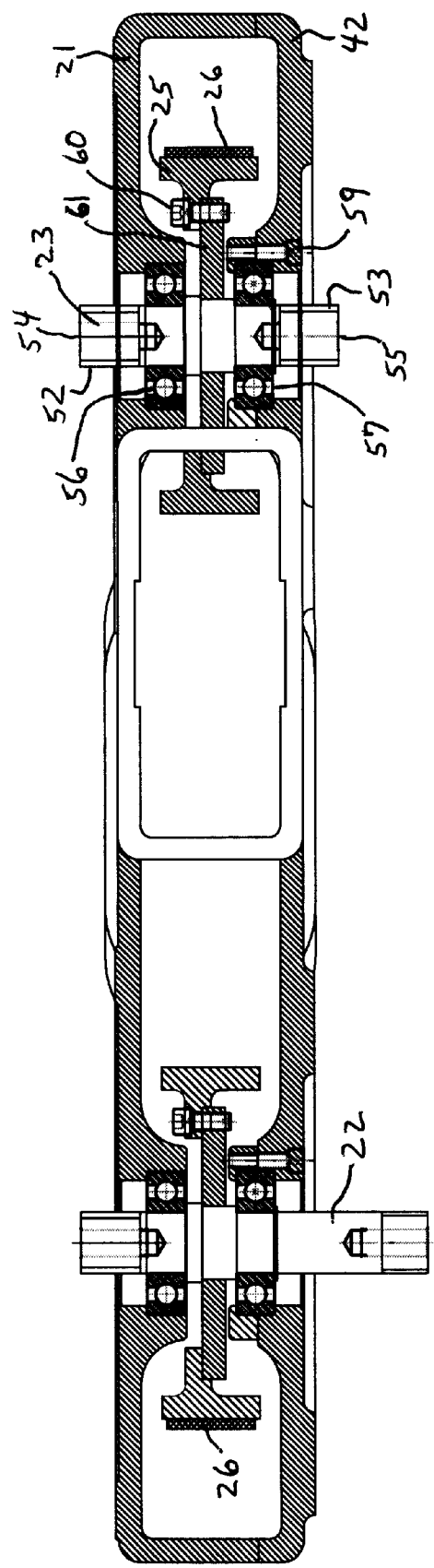
FIG. 4 is a cutaway view as viewed from the top, for showing details of an output shaft and components.

FIG. 4 includes a partial cutaway top view of the present invention to show and describe in detail an output shaft assembly, comprising output shaft 23, with depicted spline 52 and auxiliary spline 53, cut to a sufficient diameter and length for the power delivered, with first spline 52 and threaded hole 54 placed in the end of shaft, which may be used for attachment of various coupling assemblies to transfer power to various type impeller drives, with spline 53 and threaded hole 55, which may be provided to provide for connection of additional or auxiliary input power or for delivery of output power. Shown are bearings 56 and 57, shown supporting output shaft 23 for rotation, with bearings 56 and 57 carried in bores cut into the housing case 21 and housing cover 42 respectively. Bearing cap 58 is clamped tightly over the end of bearing 57, to hold the bearing in the bore and retain the assembly in a fixed axial position relative to said case 42. A plurality of screws such as screw 59 may be used to retain the bearing cap. Finally, belt pulley 25 may attach with a plurality of screws such as screw 60 to flange 61 on output shaft 23, to receive power from throughput shaft 22 through belt 26. One may also wish to attach the belt pulley by other common means. Again, it must be noted that it may be preferred to utilize a different mounting technique for the bearings, such as use of bolted assemblies, or use of sleeves within the bores, or use of other methods, and a different configuration for the housing of the invention, such as flat plates, or arched plates with spacer bars, or other supports between, but whatever the method used, the bearings must be fixed in a final location, maintaining final shaft center distances during use of the device.

Use of the Present Invention

Figure 5:
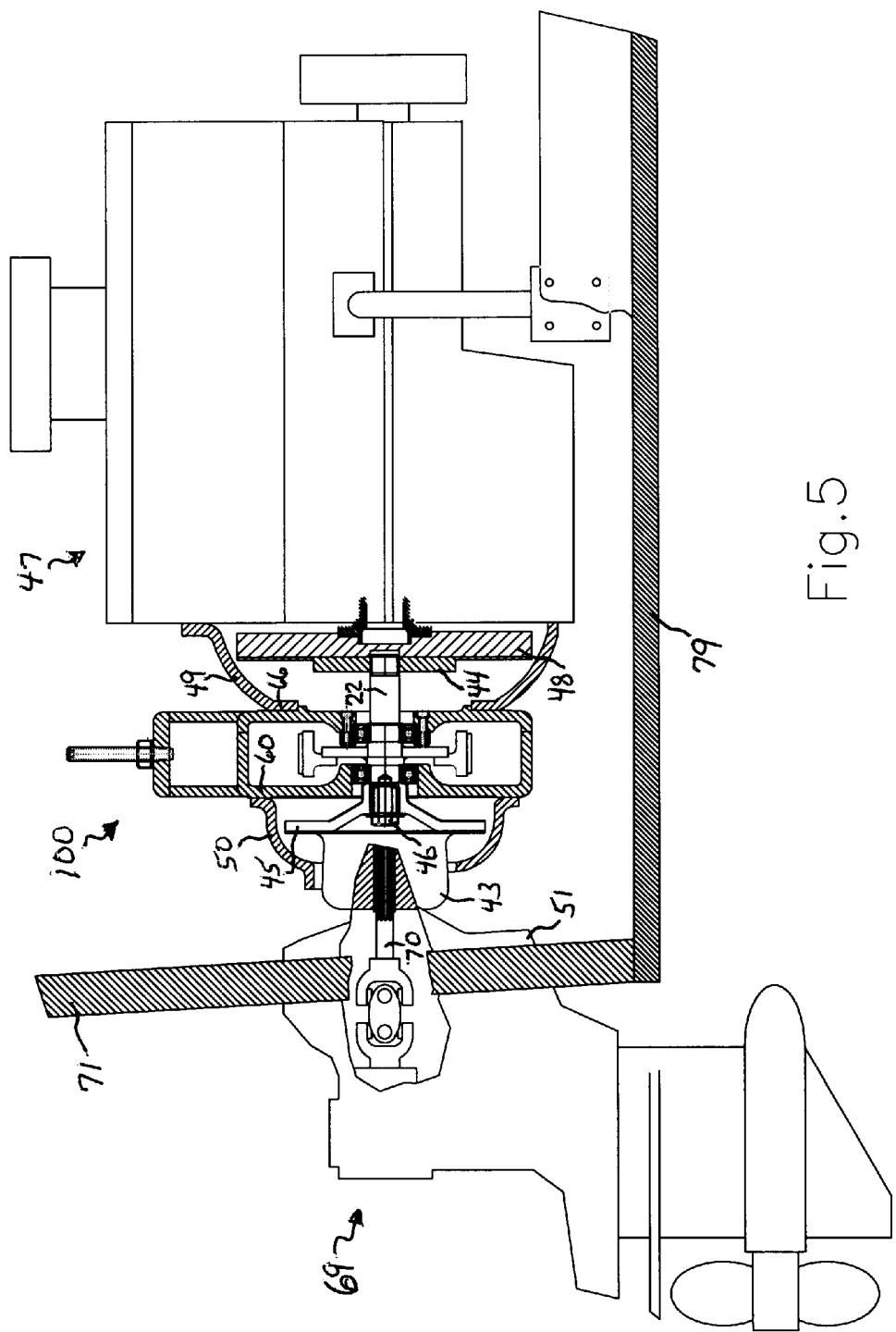
FIG. 5 depicts a partial cutaway view of the rear of a boat, viewed from the side, for showing a method of implementation.

FIG. 5 depicts an example of a method of implementing present invention 100 with plug-in type sterndrives, comprising a plug-in sterndrive 69, attached to transom 71, shown in a partial cutaway view of the rear of a boat hull 79. This view further displays the compact nature of the present invention. The figure depicts the typical and most commonly used method in the marine industry to connect an engine to a sterndrive. This is to directly plug impeller drive input shaft 70 into drive coupling 43. In the current practice of connecting singular engines to singular impeller drives, drive-coupling 43 would attach directly to flywheel 48 of engine 47. With use of the present invention, two impeller drives may be driven by the same single engine 47 by simply placing the present invention between said drive-coupling 43, and said engine flywheel 48. This may be achieved by mounting impeller drive coupling 43 to new coupling flange 45, attached to present invention throughput shaft 22 by screw 46, then inserting throughput shaft 22 into new engine drive coupling 44. This compact arrangement now allows use within the smaller recreational watercrafts.

To physically support this new arrangement, and maintaining the required concentric alignments, first impeller coupling housing 50 would attach to transmission mounting platform 65, then as previously done, rest in a precisely located manner on first impeller drive transom plate 51, with second impeller coupling housing similarly attached and similarly resting upon second impeller drive transom plate, (but which are not visible in this view), then engine 47 could be partially supported from hull 79, then attached to the present invention utilizing a standard marine engine flywheel housing 49, which would be mounted to integral platform 66, thereby providing support of the entire power delivery system, in the same manner, using the same practices as currently used in the industry.

It must be noted that the above arrangement shows only one possible method for implementation of the present invention. It may be preferred to use other methods, which are made possible through use of the various improvements and features of the present invention. These methods will become better understood with the remaining descriptions.

Additional Improvements and Uses

Figure 6:
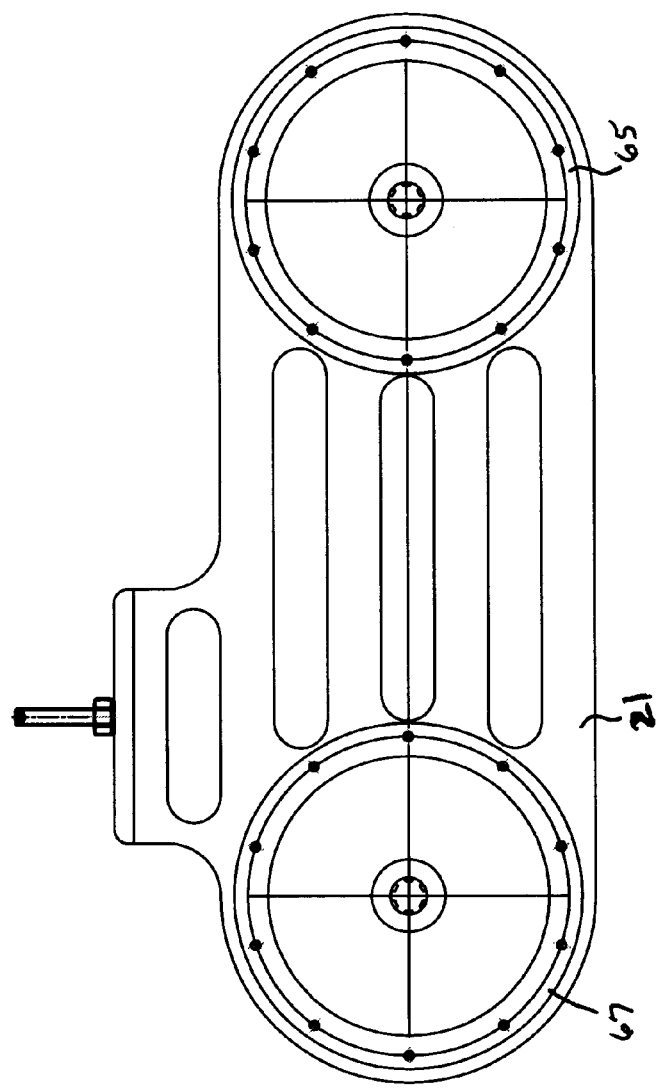
FIG. 6 is a rear view (or impeller side) for showing rear integral platform features located around each shaft.
Figure 7:
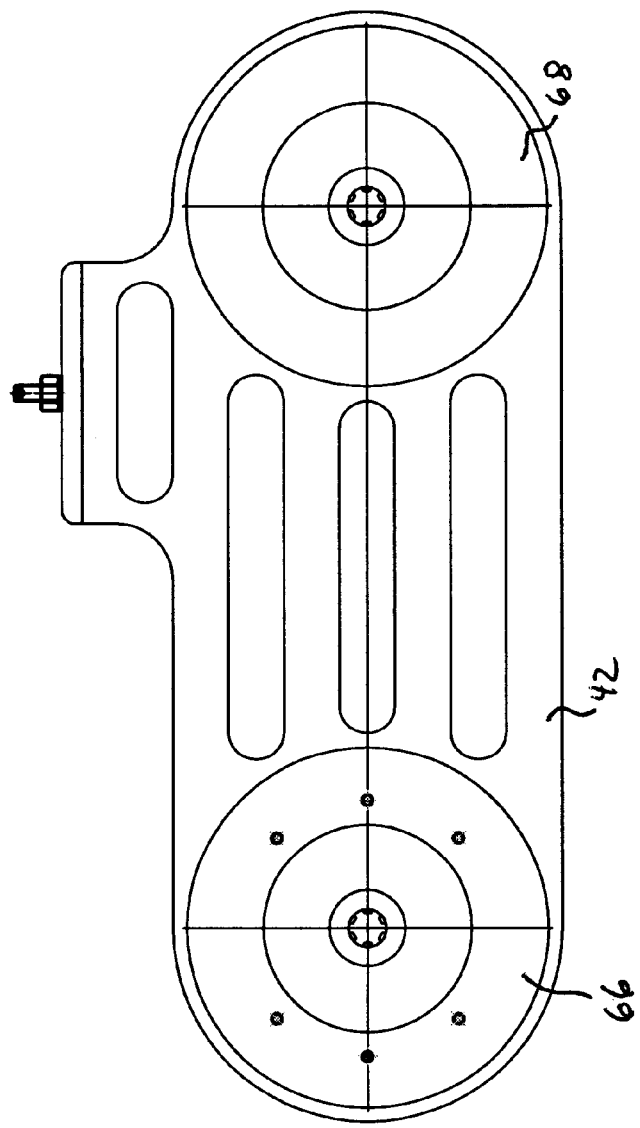
FIG. 7 is a front view (or engine side) for showing front integral platform features located around each shaft.

FIG. 6 and FIG. 7 show a set of improvement features, which are integrated and machineable mounting platforms located around each of the shafts. These may be employed for the mounting of various support brackets, flywheel housings, coupling housings, intermediate shifting devices, or other auxiliary equipment, and may be incorporated into the housing cover and the housing case, in the areas around each of the shafts.

FIG. 6 depicts the rear (or impeller side) integral platforms 65 and 67, integrated into housing case 21, both shown machined, drilled, and threaded for a pair of impeller drive coupling housings. The platforms may be machined to support any device needed for implementation of the invention in any particular craft.

FIG. 7 depicts the front (or engine side) integral platforms 66 and 68, integrated into housing cover 42, with platform 66 shown machined, drilled, and threaded for attachment of a typical marine flywheel housing, to attach an engine to the invention.

Figure 8:
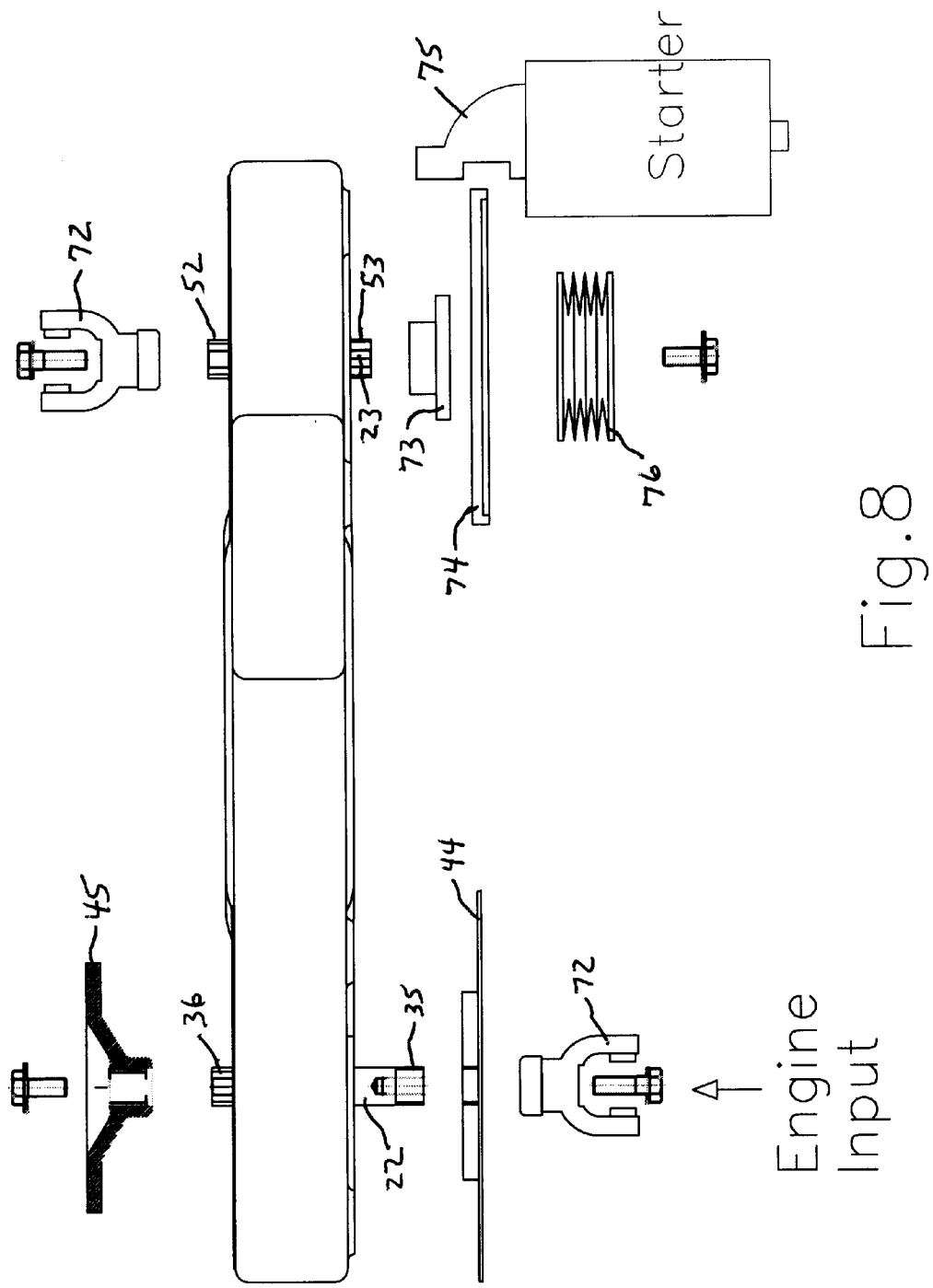
FIG. 8 depicts a top view for showing various types of input and output drive couplings, and a relocated engine starter.

FIG. 8 depicts other improvements and features of the present invention. The first is the provision of means to drivingly couple various types of input and output drive couplings to the present invention. This is to meet the various needs of the manufacturers. The means provided can be the depicted splines 35, 36, and 52, plus spline 53, but it must be noted that one may prefer another geometric shape other than splines. Examples would be, to attach, or machine a permanent adapter, or hub, or flange, to each shaft, or to provide a square shaft end, or key ways, or to simply provide the round throughput and output shaft ends for use with a clamp or welded design for attachment of couplings. Some examples of various drive couplings have been depicted below. Flange 45 depicts a means to support a direct plug-in coupler for use with a plug-in type impeller drive; drive plate 44 depicts a coupling means to transfer power from an engine flywheel directly to splines 35 of throughput shaft 22; yoke 72, shown in two different locations, for two different purposes, depicts a universal coupling that can be a means to connect a universal drive shaft to a remote mounted engine, or for making a drive shaft connection to a jet drive or any other type of propulsion drive; hub 73 depicts an attachment hub for the installation of a flywheel 74 onto one end of shaft 23, for possible engine starter 75 relocation to this cooler and more accessible location; and drive-belt pulley 76 depicts an attachment that may mount to shaft 23, for the powering of various equipment or accessories as shown in FIG. 9.

Figure 9:
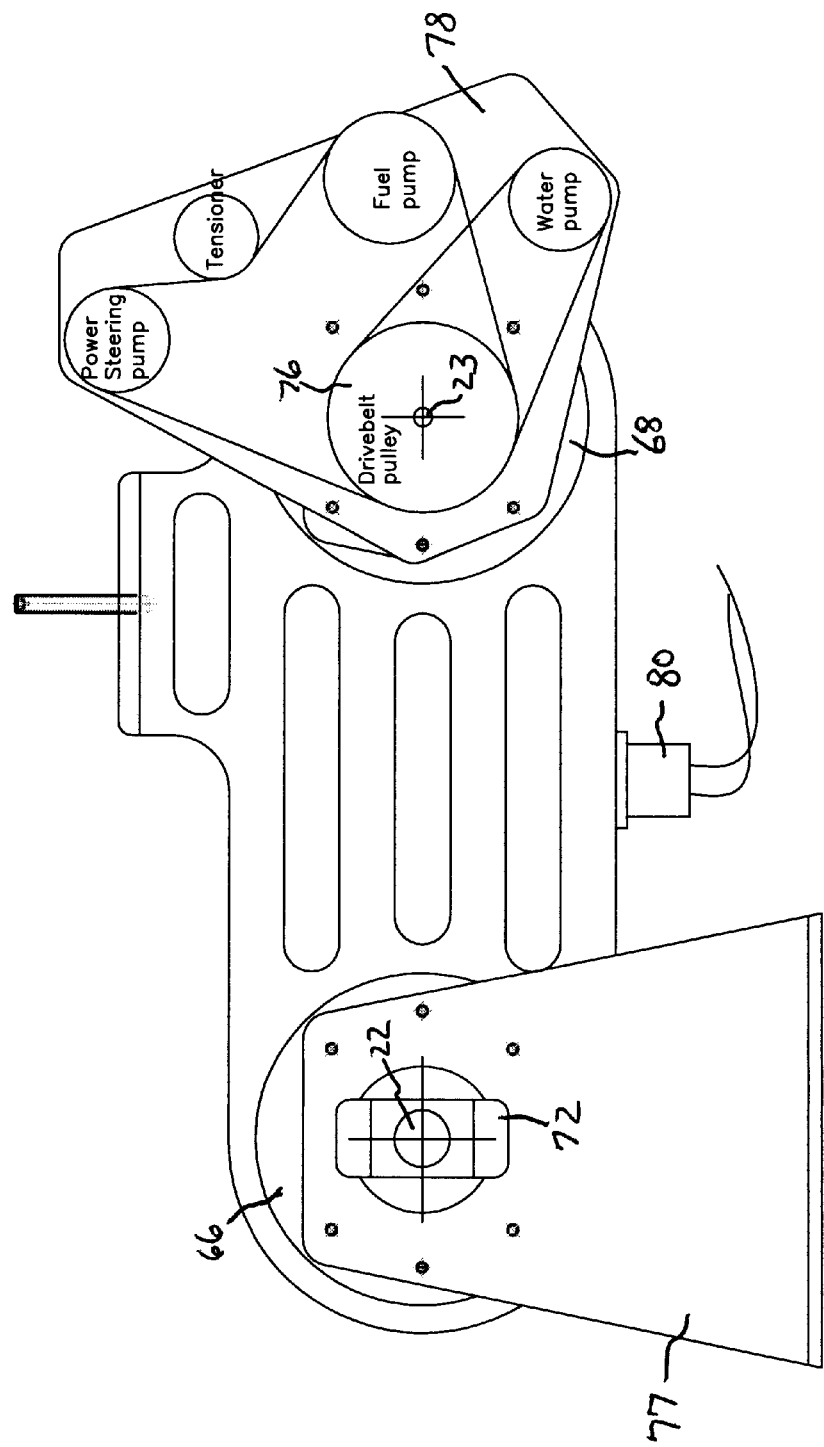
FIG. 9 depicts the front view (or engine side) for showing an alternate support method, relocated engine accessories, and a load sensor.

FIG. 9 depicts an example of an alternate method for support of the present invention in a watercraft, using a support bracket 77, which may be attached to transmission platform 66 and to the hull of a boat (not shown), and possibly used in conjunction with universal coupling 72 on the input end of throughput shaft 22, to make a drive shaft connection to a remote mounted engine.

FIG. 9 also depicts the use of one end of shaft 23, for possible powering of relocated engine accessories, comprising drive-belt pulley 76 mounted on shaft 23, for supplying power to the depicted engine accessories mounted on bracket 78, shown attached to transmission platform 68.

Also depicted in FIG. 9 is a strain or load sensing device 80, which may be attached to the transmission housing, to monitor the strain within the transmission housing, for possible conversion of that signal to a numerical display, or to activate a warning alarm if one of the impeller drives would begin having internal component problems and start consuming a disproportionate amount of power, and possibly in that case, automatically reduce engine power, preventing a catastrophic drive failure.

Figure 10:
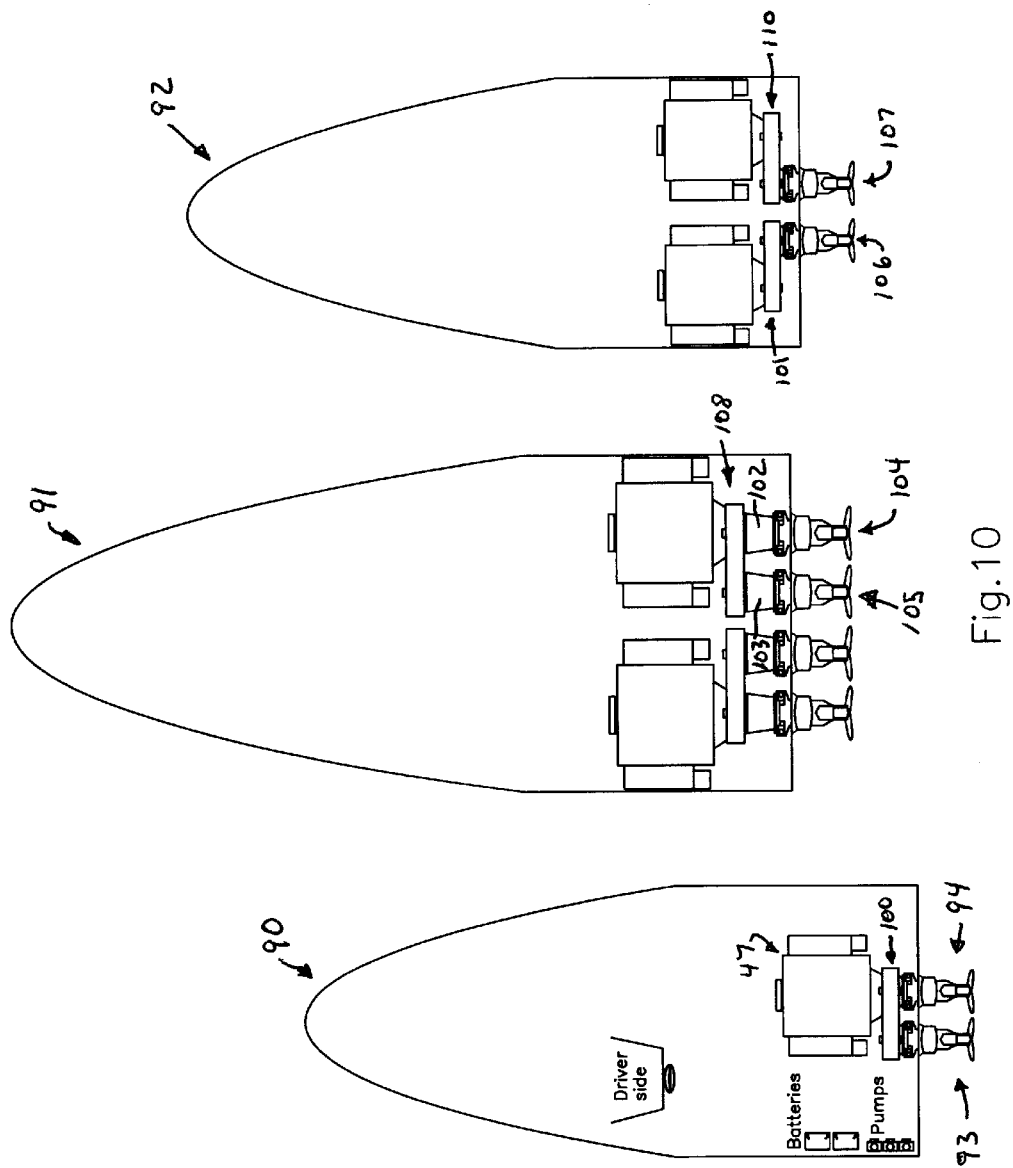
FIG. 10 shows an overhead view of three example arrangements for using the present invention within a boat.

FIG. 10 shows just three examples of the many possible methods of using the present invention to propel watercrafts. The left example depicts a single engine watercraft 90, where present invention 100 is used to power two impeller drives 93 and 94. The arrangement depicts the most compact form of the present invention, using only two shafts, and depicts the sometimes-preferred closer placement of impeller drives to each other. This cost efficient arrangement places engine 47 in an offset position relative to the longitudinal centerline of the boat. The engine is aligned with impeller drive 94. This offset position is of no importance except for the consideration of weight distribution within the boat. Allowance for an offset however, allows use of the most cost-effective form of the present invention. If the offset in weight must be compensated for, it can easily be done with strategic location of other onboard equipment, such as batteries, hydraulic pumps, fuel tanks, or other equipment.

The center example depicts how the present invention may also be used in a twin-engine craft 91, for powering of four impeller drives. This example also depicts how use of intermediate shifting devices, such as device 102 and 103, may be placed between present invention 108, and impeller drives 104 and 105, for possible use with drives that do not have internal shifting capability, or for the addition of 2-speeds forward shifting capability, for possible use in racing boats.

The right most example shows how the present invention can be used without the use of the throughput shaft to drive an impeller. In a twin-engine craft 92, when only two impeller drives 106 and 107 are preferred, present inventions 101 and 110 may be used to place those two impeller drives closer together, without the need to stagger the engines. This is especially beneficial in high performance racing crafts, to eliminate the unwanted forward weight and drag caused by staggering engines, thereby allowing greater benefit from placing the impellers closer to the center of the craft. By placing the drives closer, it can improve the performance of the craft in rough water conditions, keeping the impellers in the water a high percentage of the time. The elimination of the forward weight now increases the top speed of the craft.

It is important to point out that many other arrangements could be developed, including placement of the present invention in front of engines, and in multi-hulled crafts, or arranging for connection to impeller drives or engines with drive shafts, or in many other combinations or arrangements, but for the purpose of this disclosure are not shown.

Figure 11:
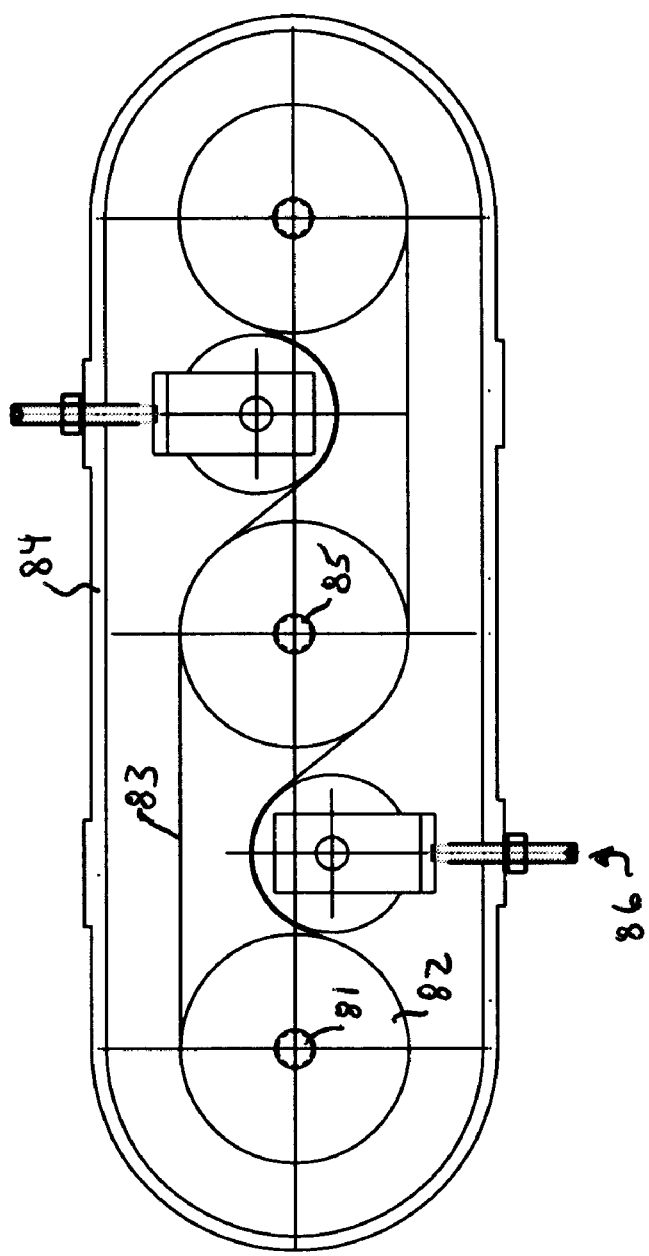
FIG. 11 is a schematic view showing the present invention employing use of a third shaft.

FIG. 11 is a schematic view of yet another form of the present invention, showing the use of a third shaft. If center placement of an engine within a watercraft must be employed, or is preferred, or if a third impeller drive is desired, a third shaft may be installed in the present invention to meet this need. The addition of the third shaft may comprise of the arrangement shown in FIG. 11, which includes third shaft 81, third belt pulley 82 attached to said third shaft 81, synchronous belt 83 rotatively coupling said third shaft to throughput shaft 85, plus use of either a fixed belt take-up pulley, or as illustrated a second adjustable tensioner assembly 86, supported within housing case 84 and providing for tension preload in said belt 83, thereby allowing the fixing of the shaft centerlines. Again, it is important to point out that other arrangements, angled configurations, combinations of components, or even use of a second pair of pulleys with an additional belt could be employed, but for the purpose of this disclosure will not be illustrated.

Figure 12:
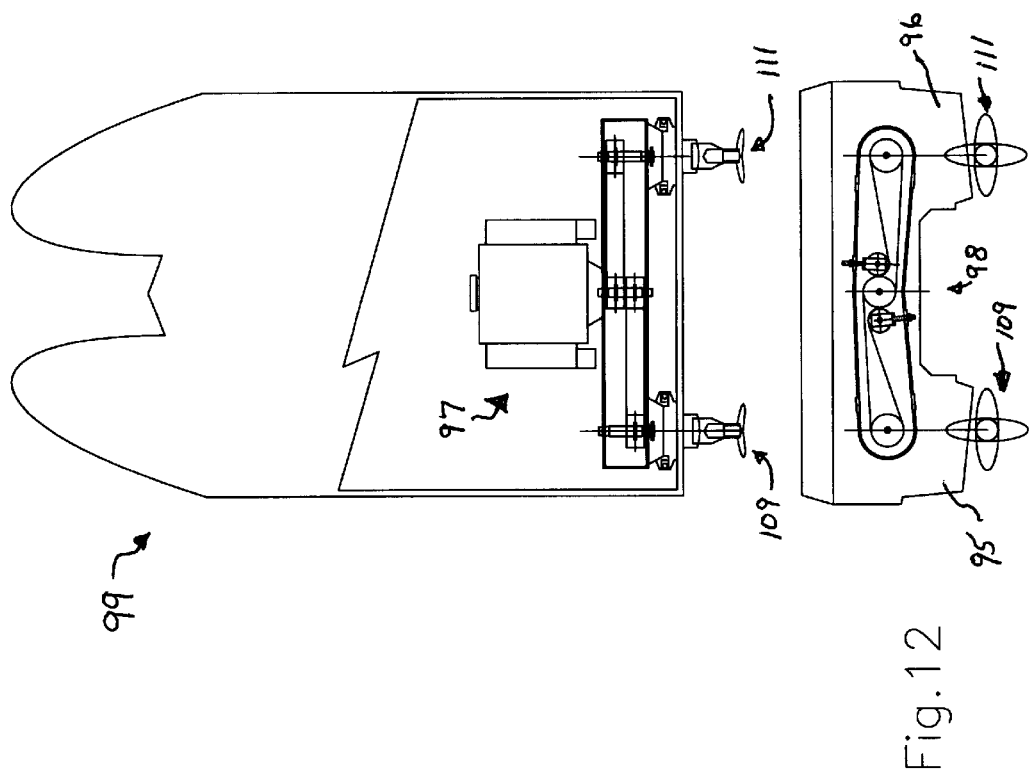
FIG. 12 depicts a new design catamaran watercraft.

FIG. 12 depicts a new type of catamaran watercraft 99, depicting placement of two impellers 109 and 111 at the spaced apart hulls 95 and 96 respectively, driven by a single engine 97. This allows for an unobstructed tunnel 98 improving aerodynamic lift, high-speed performance, and efficiency of a single engine craft. Additionally, the low speed docking maneuverability is improved through use of two spaced apart impellers.

Additional Objects of the Present Invention

Accordingly, further and additional objects of the invention are:

k) to provide the simplest form of transmission;

l) to provide a lowest cost transmission;

m) to provide a transmission allowing flexibility in impeller spacing to optimize performance of a watercraft;

n) to provide a transmission that allows use of current installation practices;

o) to provide integral mounting platforms allowing use of various connection and mounting devices;

p) to provide a transmission that allows flexibility to employ various types of drive couplings;

q) to provide a transmission with auxiliary power input or output capability;

r) to provide a means for load sensing to monitor power distribution within the transmission;

s) to provide a transmission that allows for alternate and new arrangements of impeller drives for the propulsion of watercraft.

Conclusion

Accordingly, the present invention provides for an improved transmission device for a watercraft, with many features and advantages allowing, and promoting its use throughout the boating industry. The present invention also allows creation of new product lines, by employing new arrangements of components, in new combinations, creating new methods of propelling watercrafts. The invention can provide single engine watercrafts with the advantages of twin-engine watercraft, and at half the complexity and half the weight of a twin-engine installation. The present invention can also be employed for the installation of larger high performance engines while powering multiple but standard low cost impeller drives, without fear of loss in reliability, or even be used in multiple fashion, within multiengine watercrafts, allowing for various options such as closer placement of the impeller drives without the staggering of engines.

Ramifications and Scope

Although, the description of the present invention above contains much specificity, these should not be construed as to limit the scope of the present invention, but as merely providing illustrations of some of the preferred embodiments of the present invention.

Thus, the scope of the present invention should be determined by the appended claims and their legal equivalents, rather than the examples given.

What is claimed is:

1. A transmission device for a watercraft, for the transfer of power from a single inboard engine to a plurality of impellers, comprising:

a) a housing, b) a throughput shaft mounted for rotation within said housing and capable of accepting means for transferring power into or out of at least one end, c) a output shaft mounted for rotation within said housing and capable of accepting means for transferring power into or out of at least one end, d) a pulley system including at least one synchronous belt wound about said pulley system rotatively connecting said throughput shaft to said output shaft, e) and means to preload tension into said synchronous belt, whereby said synchronous belt may be preloaded in tension sufficient in magnitude to minimize or prevent further elongation of said synchronous belt throughout its entire operating range, providing for a transmission device that now allows the fixing of shaft centerlines, in turn allowing the use of direct plug-in type impeller drives, and in a compact manner sufficient to allow use in smaller recreational watercraft.

2. The transmission device of claim 1, further including at least one belt take-up means.

3. The transmission device of claim 1, wherein at least one said shaft includes capability of accepting means for transferring power into or out of either or both ends.

4. The transmission device of claim 1, further including at least one machineable mounting platform located proximate at least one said shaft.

5. The transmission device of claim 1, further including means for rotation of at least one auxiliary device.

6. The transmission device of claim 1, further including means for monitoring strain within the housing of said transmission device.

7. The transmission device of claim 1, further including at least one belt take-up means, at least one said shaft including capability to accept means for transferring power into or out of either or both ends, and at least one machineable mounting platform located proximate at least one said shaft.

8. A transmission device for a watercraft, for the transfer of power from a single inboard engine to a plurality of impellers, comprising:

a) a housing, b) a throughput shaft mounted for rotation within said housing and capable of accepting means for transferring power into or out of at least one end, c) at least one output shaft mounted for rotation within said housing and capable of accepting means for transferring power into or out of at least one end, d) a pulley system including at least one synchronous belt wound about said pulley system rotatively connecting said throughput shaft to said output shaft, e) and means to preload tension into said synchronous belt, whereby said synchronous belt may be preloaded in tension sufficient in magnitude to minimize or prevent further elongation of said synchronous belt throughout its entire operating range, providing for a transmission device that now allows the fixing of shaft centerlines, in turn allowing the use of direct plug-in type impeller drives, and in a compact manner sufficient to allow use in smaller recreational watercraft.

9. The transmission device of claim 8, further including at least one belt take-up means.

10. The transmission device of claim 8, wherein at least one said shaft includes capability of accepting means for transferring power into or out of either or both ends.

11. The transmission device of claim 8, further including at least one machineable mounting platform located proximate at least one said shaft.

12. The transmission device of claim 8, further including means for rotation of at least one auxiliary device.

13. The transmission device of claim 8, further including means for monitoring strain within the housing of said transmission device.

14. The transmission device of claim 8, further including at least one belt take-up means, at least one said shaft including capability to accept means for transferring power into or out of either or both ends, and at least one machineable mounting platform located proximate at least one said shaft.

15. A method for propelling a watercraft for the conveyance of at least one person, comprising:

a) providing at least one inboard power source for providing rotational energy for the propelling of said watercraft, b) providing a transmission device for a watercraft that includes a housing, a throughput shaft that is mounted for rotation within said housing and capable of accepting means for transferring power into or out of at least one end, an output shaft that is mounted for rotation within said housing and capable of accepting means for transferring power into or out of at least one end, a pulley system that includes at least one synchronous belt for rotatatively connecting said throughput shaft to said output shaft, and a means to preload tension into said synchronous belt, for rotatively coupling said inboard power source to at least two impellers, c) and providing at least two impellers on said watercraft for the propelling of said watercraft.

* * * * *